United States Patent [19]
Williams

[11] Patent Number: 5,623,422
[45] Date of Patent: Apr. 22, 1997

[54] METHOD FOR PRIORITIZING CHANNELS IN A COMMUNICATION SYSTEM

[75] Inventor: James M. Williams, Lombard, Ill.

[73] Assignee: Motorola, Inc., Schaumburg, Ill.

[21] Appl. No.: 361,064

[22] Filed: Dec. 21, 1994

[51] Int. Cl.⁶ ..................................................... H04H 1/00
[52] U.S. Cl. ..................... 364/514 C; 455/5.1; 455/67.1
[58] Field of Search ........................ 364/514 C; 455/5.1, 455/6.1, 67.1, 134; 370/95.2

[56] References Cited

U.S. PATENT DOCUMENTS

| | | | |
|---|---|---|---|
| 5,142,690 | 8/1992 | McMullan, Jr. et al. ................. | 455/6.1 |
| 5,155,590 | 10/1992 | Beyers, II et al. ....................... | 358/86 |
| 5,225,902 | 7/1993 | McMullan, Jr. ........................... | 358/86 |

OTHER PUBLICATIONS

Generic Criteria for Version 0.1 Wireless Access Communications Systems (WACS) published by Bellcore, 1993 (TR–INS–0011313), specifically Sections 6 and 7, among others.

Personal Access Communications System Air Interface Standard J–STD–014 (PACS) published by Technical Ad Hoc Group 3 of the T1/T1A Joint Technical Committee, specifically Sections 6 and 7, among others.

*Primary Examiner*—Emanuel T. Voeltz
*Assistant Examiner*—Patrick J. Assouad
*Attorney, Agent, or Firm*—Aaron Bernstein; Jordan C. Powell

[57] ABSTRACT

Carriers (51) in a communication system (10) are prioritized (70) according to their usability. The carriers (51) that are below a usability threshold are placed on an ingress list (122). Those that exceed the threshold are placed on a preferred list (121). The carriers (51) on the preferred list (121) are then ranked (76) according to their word error rates (WER) and signal quality (SQ). The carriers (51) on the ingress list (122) have their usability re-checked periodically and may be transferred to the preferred list (121) if their usability does not again drop below threshold during a pre-set time period.

4 Claims, 5 Drawing Sheets

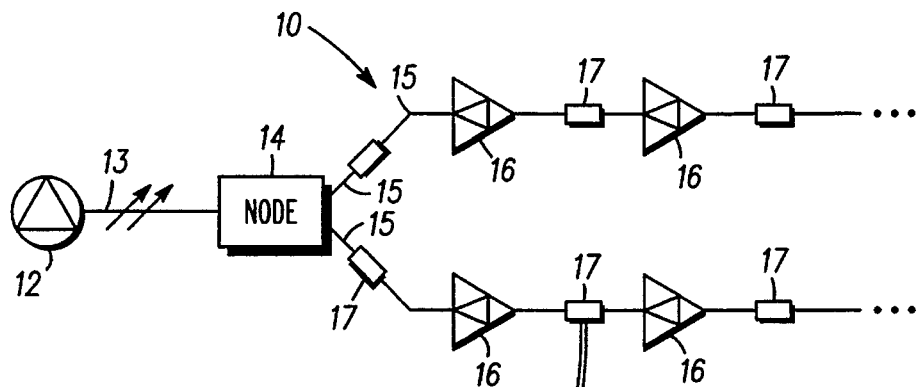
FIG.1
FIG.2
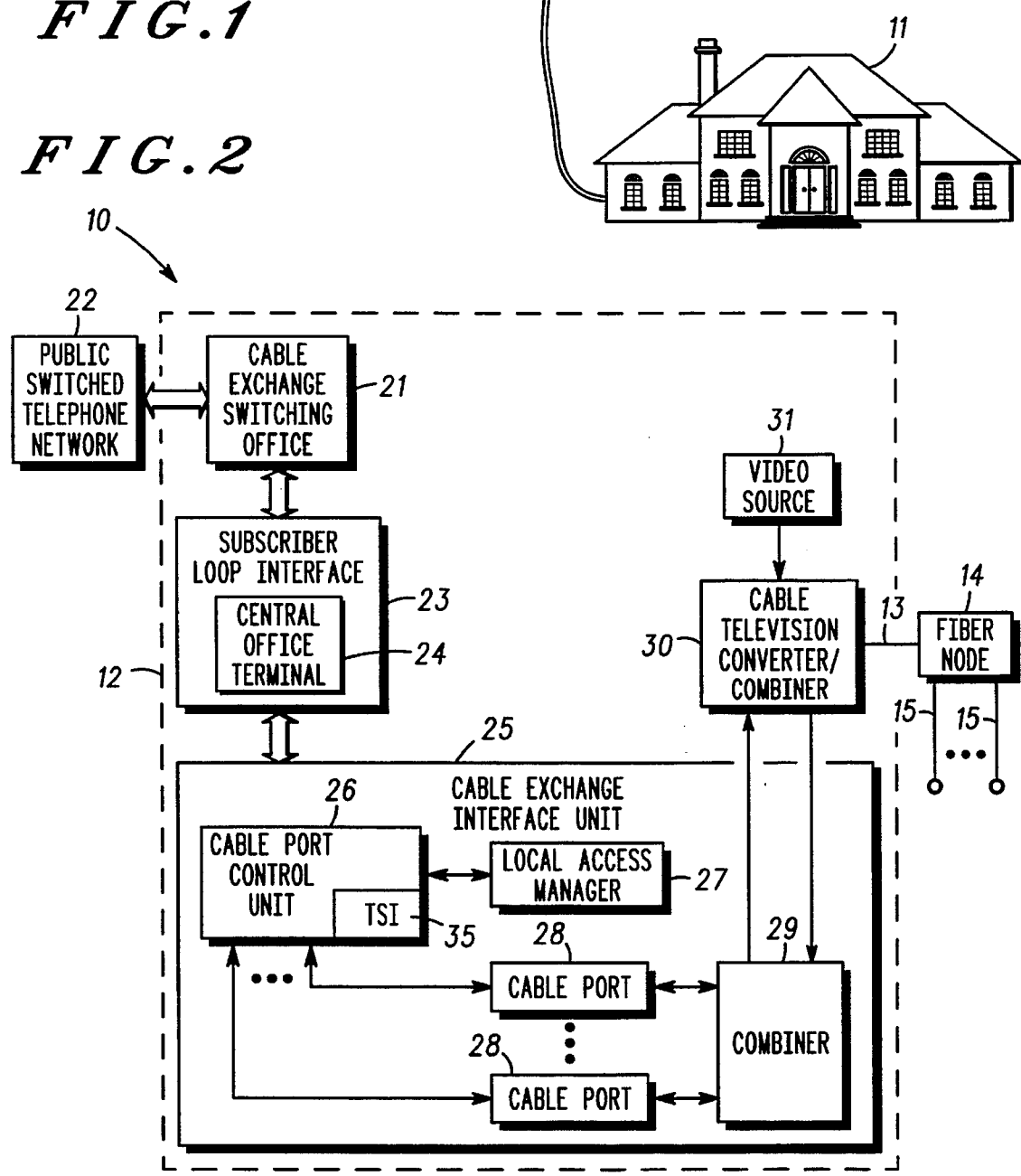

METHOD FOR PRIORITIZING CHANNELS IN A COMMUNICATION SYSTEM

FIELD OF THE INVENTION

The present invention relates, in general, to communication systems and, more particularly, to a method for prioritizing channels in a communication system.

RELATED INVENTIONS

The present invention is related to the following invention, which is assigned to the assignee of the present invention: Method and Apparatus for Trunked Telephone Access to a Cable Network invented by Behrens et al., having Ser. No. 08/123,658 and filed on 20 Sep. 1993.

BACKGROUND OF THE INVENTION

In many types of communication systems, such as wireless systems and systems configured based upon radiotelephone-like technology (such as some of the proposed cable systems), sporadic interference may occur.

In cable distributions systems, the system is sealed to prevent the radio frequency (RF) signals from leaking out into the surrounding areas as well as prevent leakage "ingress" into the cable system. This type of ingress can be due to typical wireless systems (e.g. dispatch, cellular, etc.) as well as other types of equipment (e.g. radiation from commercial, medical, and industrial equipment).

When ingress occurs in the downstream spectrum of the cable (the portion currently used for video transmissions) it may be seen as distortion (such as snow) on the picture or effect the sound. The upstream and downstream portions will both be carrying other signals such as voice and data, which may also be corrupted.

Presently, it is expected that ingress is likely to be narrow band in nature (on the order of tens of kilohertz, kHz) and located more in the upstream portion of the cable spectrum. In addition, ingress will be more disruptive to a cable exchange services which provide for alternate, competitive, basic telephony services in local exchange areas or for alternate access to inter-exchange services. The cable exchange service may also provide other special services such as data, ISDN, digital video phone, and interactive multi-media services.

Therefore, it would be desirable for the operators of such a system to minimize the potential distortion and provide a system having optimal performance.

BRIEF DESCRIPTION OF THE DRAWINGS

FIG. 1 is a block diagram of a basic cable television system;

FIG. 2 is a more detailed block diagram of the headend of the system of FIG. 1;

DETAILED DESCRIPTION OF THE DRAWINGS

Figure 3:
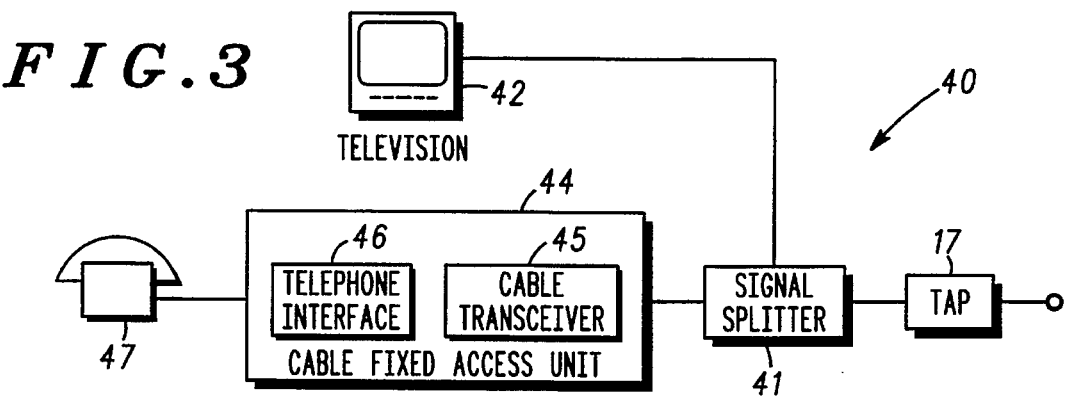
FIG. 3 is a block diagram of the subscriber premises equipment.

While capable of being used in most communication systems, the present invention will be described primarily in connection with cable type communication systems. Cable systems, such as cable television (CATV) networks, are typically configured in a tree-and-branch backbone arrangement. Referring initially to FIG. 1, a block diagram of a basic CATV communication system, generally designated 10, is illustrated.

System 10 shows the tree-and-branch arrangement in which a plurality of subscribers 11 share a common branch. Basically, system 10 consists of a headend 12 (which is equivalent to a base site in wireless systems), described in more detail below, and, preferably, a fiber link 13 to a fiber node 14. Each fiber node 14 will typically have a coaxial cable 15 leading therefrom. Inserted along coaxial cable 15 is a series of amplifiers 16 and taps 17. As illustrated here, amplifiers 16 are two way amplifiers. Two way amplifiers are illustrated because of the utilization of the cable network to transport information in both directions.

Referring now to FIG. 2, a more detailed block diagram of headend 12 of system 10 is provided. Headend 12 consists of a cable exchange switching office (CESO) 21 coupled to a public switched telephone network (PSTN) 22. PSTN 22 is the outside network which receives and transmits various signals (i.e. voice, data, video, etc.). Included with CESO 21 at headend 12 is the subscriber loop interface 23 which may contain a central office terminal (COT) 24. The signals are connected to a cable exchange interface unit (CEX) 25. CEX 25 is comprised of a cable port control unit (CPCU) 26, a local access manager (LAM) 27, a plurality of cable ports (CPs) 28, and a combiner 29. Cable exchange interface 25 is coupled to a CATV converter/combiner 30; which is also coupled to a video source 31 and to the rest of the CATV network through fiber link 13.

Subscriber loop interface 23 is used to couple CPCU 26 to CEX 21. Digital carrier facilities, such as T1 or E1 may be used for this connection. The multiplexing and signaling format will conform to one of the major standards for digital subscriber loop transport. Such major standards include those described in Bellcore documents TR-TSY-000008, TR-NWT-000303, V5.1 or V5.2. For CEXs with integrated subscriber loop capabilities, the dedicated subscriber line appearances are virtual, in which case COT 24 would not be required. With other CEXs, the subscriber lines would be physical in the form of analog lines; and would require the use of COT 24.

Within cable exchange interface unit 25, CPCU 26 interfaces to a plurality of CPs 28. This also provides the functions necessary to support the data link layer of the cable exchange access interface (CEAI) which is the transport, signaling, and control protocol used between headend 12 and subscriber premises equipment 40 of FIG. 3. The CEAI is similar in may respects to an air interface typically used in shared wireless radiotelephone systems. An example of a potential interface is provided in the Bellcore document "Generic Criteria for Version 0.1 Wireless Access Communications (WACS)", Issue 1 (October, 93). The CEAI proposed herein has the following structure:

| | |
|---|---|
| Frequency Band | Downstream: 50–750 MHz |
| | Upstream: 5–42 MHz |
| Duplex Method | Frequency Division Duplex (FDD) |
| Voice Coding | 32 kbps Adaptive Differential Pulse Code Modulation (ADPCM) |
| Multiplexing | Time Division, 10 slots per frame |
| Burst Structure | 100 bits per time slot |
| Frame Rate | 500 frames per second |
| Bit Rate | 500 Kilobits per second (Kbps) |
| Carrier Spacing | 400 kiloHertz (KHz) |
| Access Method | At least one RF traffic link in each cable branch is marked as "Idle and Available", by the system. The subscriber acquires frame synchronization with idle traffic link by means of a known bit pattern used in a digital correlation process. The subscriber terminal then initiates access on the idle traffic link. |

The functions provided by CPCU 26 include: transcoding between the pulse code modulation (PCM) of subscriber loop interface 23 and the voice coding scheme of the CEAI physical channel structure, and multiplexing/demultiplexing traffic and control channels on both the CEAI and subscriber loop interface 23.

CPCU 26 contains a time slot interchanger (TSI) 35 used to interconnect any time slot in subscriber loop interface 23 with another in the CEAI facilities of cable ports 28. CPCU 26 also interfaces to LAM 27 to transfer signaling and control messages. It should be noted here that LAM 27 may be integrated into CPCU 26.

LAM 27 is used to terminate the signaling channels of the digital subscriber loop and CEAI 25 and performs any needed protocol conversions. LAM 27 provides the logic to control the system information broadcasting, alerting, access, authentication, and encryption processes on CEAI 27. Further, LAM 27 correlates the subscriber terminal identity with the appropriate subscriber line appearance; and manages time slot interconnections by TSI 35 in CPCU 26.

Cable ports 28 contain one or more digital transceivers, tuned to operate on pairs of radio frequency (RF) carriers. These may also be integrated into CPCU 26.

Converter/combiner 30 converts modulated RF carriers received from the video sources and from CPs 28 into the proper frequencies within the cable spectrum. These signals are then combined and used to modulate an optical carrier for downstream transmission. Converter/combiner 30 also demodulates and converts the upstream optical carriers to their proper RF frequencies. These RF carriers are then passed to CPs 28.

Video sources 31 are sources of television programming from any of various sources such as: video tape, satellite transmissions, off-the-air TV broadcasts, etc.

Fiber node 14 is used to convert, bi-directionally, between the optical domain of the fiber backbone and the electrical domain of the coaxial distribution network.

Referring now to FIG. 3, a block diagram of the subscriber premises equipment, generally designated 40, is illustrated. Subscriber premises equipment 40 consists of a signal splitter 41 used to divide the signal in order to provide it to various devices. In this example, the signal is being provided to a television 42 and a phone 43. The signal provided to phone 43 is processed thorough a cable fixed access unit (CFAU) 44. CFAU 44 consists of a cable transceiver 45 and a telephone interface 46.

The above described system uses a trunked transport technology. A trunked system is one in which the traffic channel is not dedicated to a particular user, but is available to all users.

Figure 4:
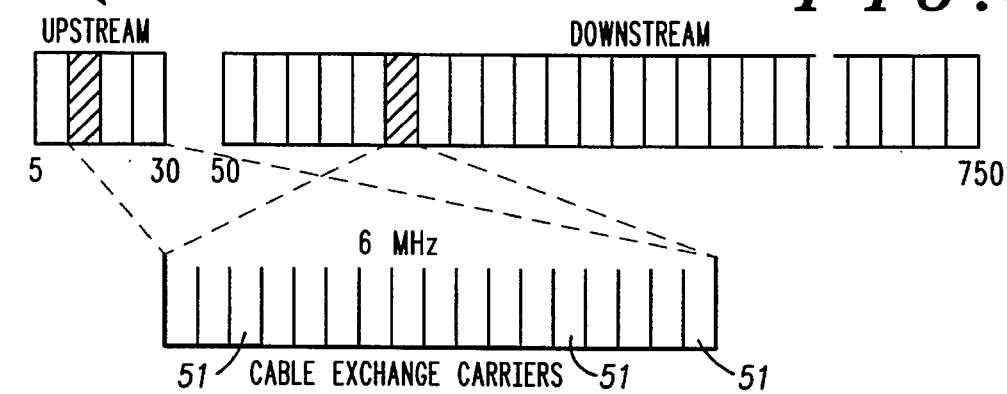
FIG. 4 is a chart showing spectrum allocation in a cable communication system.

In a cable system, a certain amount of cable spectrum is usable. One distinction between a cable system and a wireless system is that all of this spectrum can be reused in each branch of the cable system. In FIG. 4, a spectrum chart, generally designated 50, is shown illustrating one potential allocation of carriers 51. As illustrated, the downstream portion of the spectrum is much larger than the up stream portion. This is dictated by the requirements of the system. Presently, the downstream is needed to carry a large number of conventional television channels. This same capacity is not used on the upstream.

In a preferred system, there may be 120 channels, each 6 MHz in width, used to carry the television signals. In a network offering a cable exchange service, a portion of the downstream spectrum, typically an integer multiple of 6 MHz, and an equivalent spectrum in the upstream are dedicated to a plurality of trunked traffic channels serving a large number of subscribers having telephone and/or other two-way services. According to the CEAI standards set forth above, the RF carriers are spaced 400 kHz apart and each carries ten digitally encoded time division multiplexed information bearing traffic channels. The system is designed as a frequency division duplex (FDD) system which means that carriers are utilized in pairs with one for the upstream and the other for the downstream. An upstream carrier is typically matched with a downstream carrier to form a duplex pair either by means of a fixed, pre-determined relationship, or dynamically under the control of CPCU 26 as the need for additional traffic-carrying capacity arises.

Figure 5:
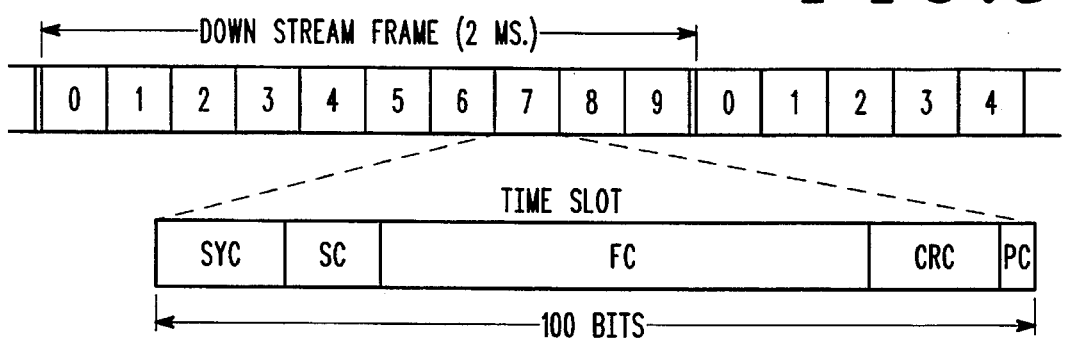
FIGS. 5 and 6 are block diagrams illustrating the structure of the frames and slots of downstream and upstream transmissions, respectively.

As indicated above, each frame has ten slots. Each slot contains 100 bits. The bits in a slot are divided as shown in FIG. 5 (downstream) and FIG. 6 (upstream). In the downstream slot of FIG. 5, the following bits are allocated for each portion:

TABLE 1

| DOWNSTREAM BIT ALLOCATION | |
|---|---|
| Synchronization Channel (SYC) | 14 bits |
| Slow Channel (SC) | 9 bits |
| Fast Channel (FC) | 64 bits |
| Cyclic Redundancy Code (CRC) | 12 bits |
| Power Control Channel (PC) | 1 bit |

Figure 6:
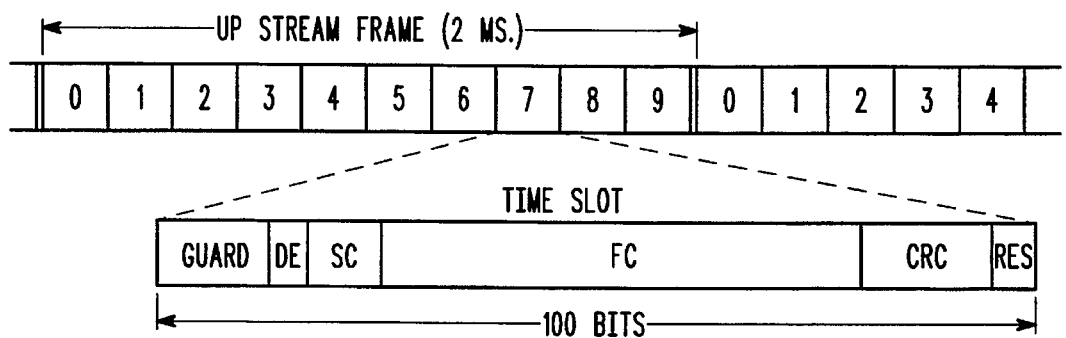

In the upstream slot of FIG. 6, the bits are allocated as follows:

TABLE 2

| UPSTREAM BIT ALLOCATION | |
|---|---|
| Guard | 12 bits |
| Differential Encoding (DE) | 2 bits |
| Slow Channel (SC) | 9 bits |
| Fast Channel (FC) | 64 bits |
| Cyclic Redundancy Code (CRC) | 12 bits |
| Reserved (RES) | 1 bit |

In the system design, the location of the upstream and downstream spectrum allocated for cable exchange service is known to the CFAUs. When a CFAU is first brought on line, it will automatically scan the downstream carriers attempting to acquire frame synchronization with the system broadcast channel (SBC) which occupies one of the time slots on one of the carrier pairs in each branch of the cable system.

Every downstream time slot is marked with a unique bit pattern indicating a possible assignment. Those assignments may include the following:

TABLE 3

CHANNEL ASSIGNMENTS

System Broadcast Channel - System Information & Alerting;
Traffic Channel - Idle, Unavailable;
Traffic Channel - Idle, Full Rate (32 Kbps or less);
Traffic Channel - Idle, Half Rate (16 Kbps or less);
Traffic Channel - Idle, Quarter Rate (8 Kbps or less);
Traffic Channel - Idle, Eighth Rate (4 Kbps or less);
Traffic Channel - Idle, for contention access;
Traffic Channel - Idle, for priority access; and
Traffic Channel - Busy.

The SBC contains two logical information streams: the system information channel (SIC) and the alerting channel (AC). When a CFAU locates the SBC, it will listen to the SIC for information of general interest to all terminal devices and then access the system to conduct a registration transaction so that it may be assigned an Alert Identification. For the registration access, frame synchronization is acquired via the same kind of digital correlation process as for the SBC acquisition except that the bit pattern for an available, idle traffic channel, is used. After registration, the CFAU will re-acquire the SBC and listen to the AC for notification of incoming calls.

These systems also include a provision for alternate link transfer (ALT) so that a subscriber unit (SU), engaged in an ongoing call, may be transferred to a different radio link wherever the original link becomes degraded. In order to accomplish this, it would be desirable to use a method that provides improved quality and minimizes the impact seen by the users. To effect these goals, the system should be designed to: detect the onset of interference on a carrier; and effect the transfer of active calls to an alternate carrier when interference is detected. The pairing of particular upstream and downstream carrier frequencies to be used for the SBC are determined by CPCU 26. It is important that the best available selection be made so that the system may operate with minimal disruption. CPCU 26 makes its selections with reference to lists of candidate carrier frequencies ordered according to various measures of usability. Since the upstream and downstream carrier frequencies are managed separately, two sets of these lists are maintained by CPCU 26, operating in conjunction with CPs 28 and CFAUs 44. The procedures are described below in general terms. It should be kept in mind that the results of these procedures are applied independently to the lists for both upstream and downstream carriers.

For any carrier set to which one or more users are actively assigned, the receiver in CFAU 44 measures usability data for the downstream carrier and reports the results to a CP 28. The receiver in the CP 28 measures the upstream carrier and reports those results, along with the downstream results sent by CFAU 44, to CPCU 26. All usability data are collected and reported automatically and continuously.

For carrier frequencies that are not in active use, any idle CP 28 can be used in conjunction with special CFAUs located at the ends of cable branches to routinely establish traffic on otherwise unused frequency sets. This will enable the usability of such carriers to be determined and recorded. When idle, a test CFAU 44 would simply monitor the system alerting channel. As part of its normal operation, CPCU 26 would select a pair of unused frequencies, set up the extra CP 28 to use those frequencies, send an alert to the test CFAU 44 and assign the test CFAU 44 to the selected channel set. The extra CP 28 and the test CFAU 44 would then perform a simple test session during which usability data would be obtained in the normal way.

In measuring usability, the process measures word error rate (WER) and signal quality (SQ). These two measures are then used to determine usability. The signal quality measure, in this preferred embodiment, is the eye opening of the signal. However, it will be understood by those of skill in the art that there are many different measures of signal quality, such as signal strength, and that the present invention is not limited to these particular measures. It should be understood here that while a carrier will have several traffic channels (e.g. time slots) that the usability of a carrier will typically impact all of the traffic channels on a carrier, not just one.

Figure 7:
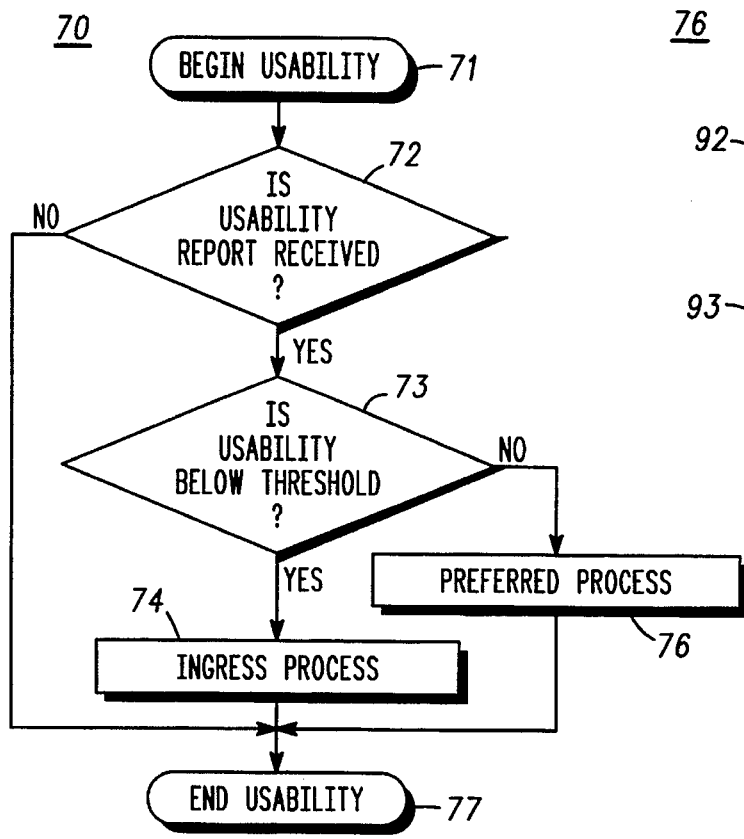
FIGS. 7–9 are flow charts of a process embodying a method for priortizing channels in a communication system.

Referring now to FIG. 7, a flow chart of a method of prioritizing channels by usability, generally designated 70, embodying the present invention is illustrated. In this preferred embodiment, method 70 is controlled by CPCU 26, but could be conducted in any processing location at head-end 12 and may additionally involve the CFAU 44. Method 70 commences at step 71 and determines if a usability report (or other indication of usability) was received, decision step 72. This request may be the result of a standard routine (such as reports provided from the CPs) or the result of some perceived problem. It should be understood here that while a carrier will have several traffic channels (e.g. time slots) that interference on a carrier will typically impact all of the traffic channels on a carrier, not just one. If no usability report was received, method 70 ends, step 77.

If a usability report has been received, decision step 72, then method 70 determines if the usability reported is below a threshold, decision step 73. If the usability is below the threshold, an INGRESS subprocess 74 is implemented. If the usability is not below a threshold, then a PREFERRED subprocess 76 is entered. Following either subprocess 74 or 76 method 70 ends, step 77.

Figure 8:
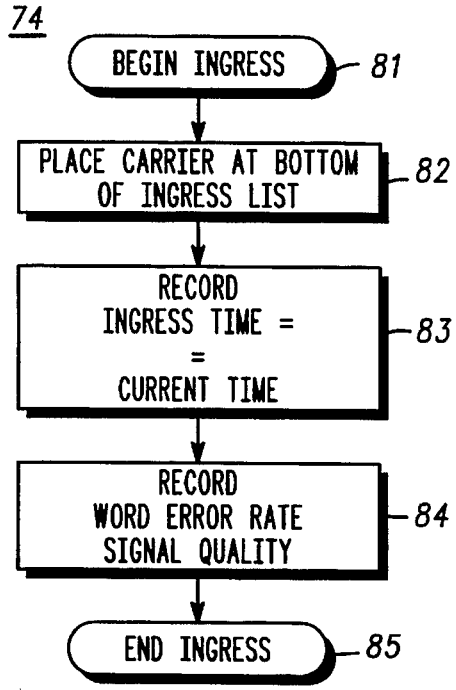
Figure 12:
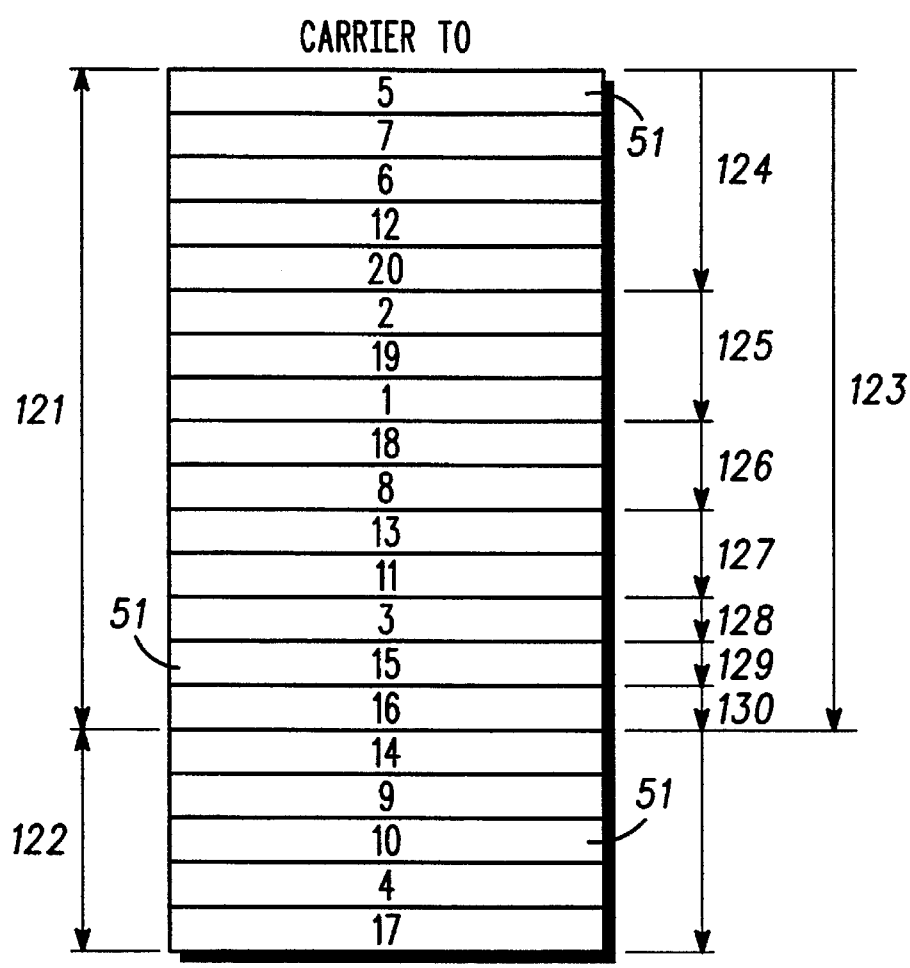
FIG. 12 is a block diagram of a carrier list.

Subprocess INGRESS 74 is illustrated in more detail in FIG. 8. Subprocess 74 begins at step 81 and places the carrier on the bottom of an ingress list 122, FIG. 12. It should be noted here that even carriers already on ingress list 112 have their usability determined periodically so that being on the bottom of the list simply means that the carrier is the latest in time for which ingress was detected. Next, subprocess 74 records the current time as the latest time of ingress for the particular carrier, step 83. The usability data, WER and SQ, is then recorded in step 84. Finally, subprocess 74 returns to process 70, step 85.

If the carrier does not have a usability below threshold, decision step 73 of FIG. 7, then PREFERRED subprocess 76 is executed. This is illustrated in more detail in FIG. 9. Subprocess 76 orders a preferred list according to usability, which may involve a single usability parameter or, as in this preferred embodiment, multiple parameters. Subprocess 76 commences at step 91 and records the usability parameters, WER and SQ, step 92. The carrier is then placed on the preferred list in rank order with, in this embodiment, the WER having priority, step 93. This is illustrated by portion 123 of list 120 of FIG. 12. As illustrated, this is also the entire portion of preferred list 121. Within each WER ranking, carriers having the same WER are ranked according to their SQ. These are illustrated by the groups 124–130 of list 120, FIG. 12. Subprocess 76 then ends, step 94, and returns to method 70.

Figure 10:
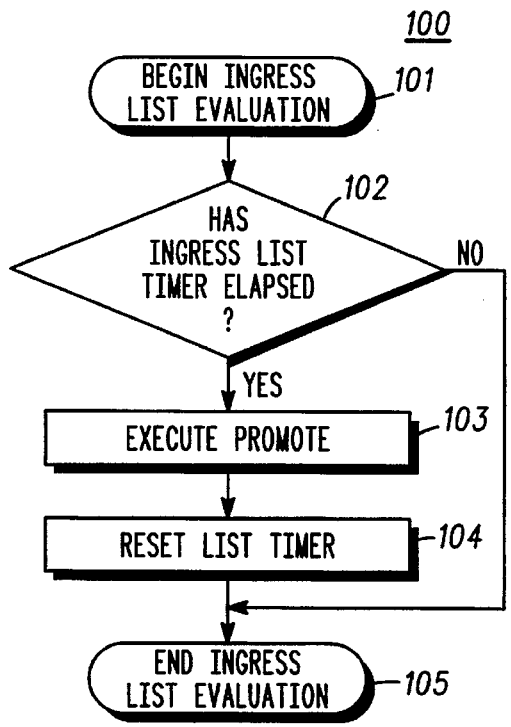
FIGS. 10 and 11 are flow charts of a process embodying a method for evaluating an ingress list.

As mentioned above, once a carrier is placed on an ingress list it is removed from that list after a predetermined time if no further ingress is detected. This process, generally designated 100, is illustrated in FIG. 10 starting at step 101. At selected intervals, process 100 evaluates the carriers currently on any ingress list to determine if any are eligible for promotion to a preferred list. Process 100 first examines an ingress list time to determine if it is time to evaluate the ingress list, decision step 102. If not, process 100 ends, step 105, and CPCU continues on with its normal control activities. If it is determined in decision step 102 that the ingress list time has expired, then PROMOTE subprocess 103 is executed.

Figure 11:
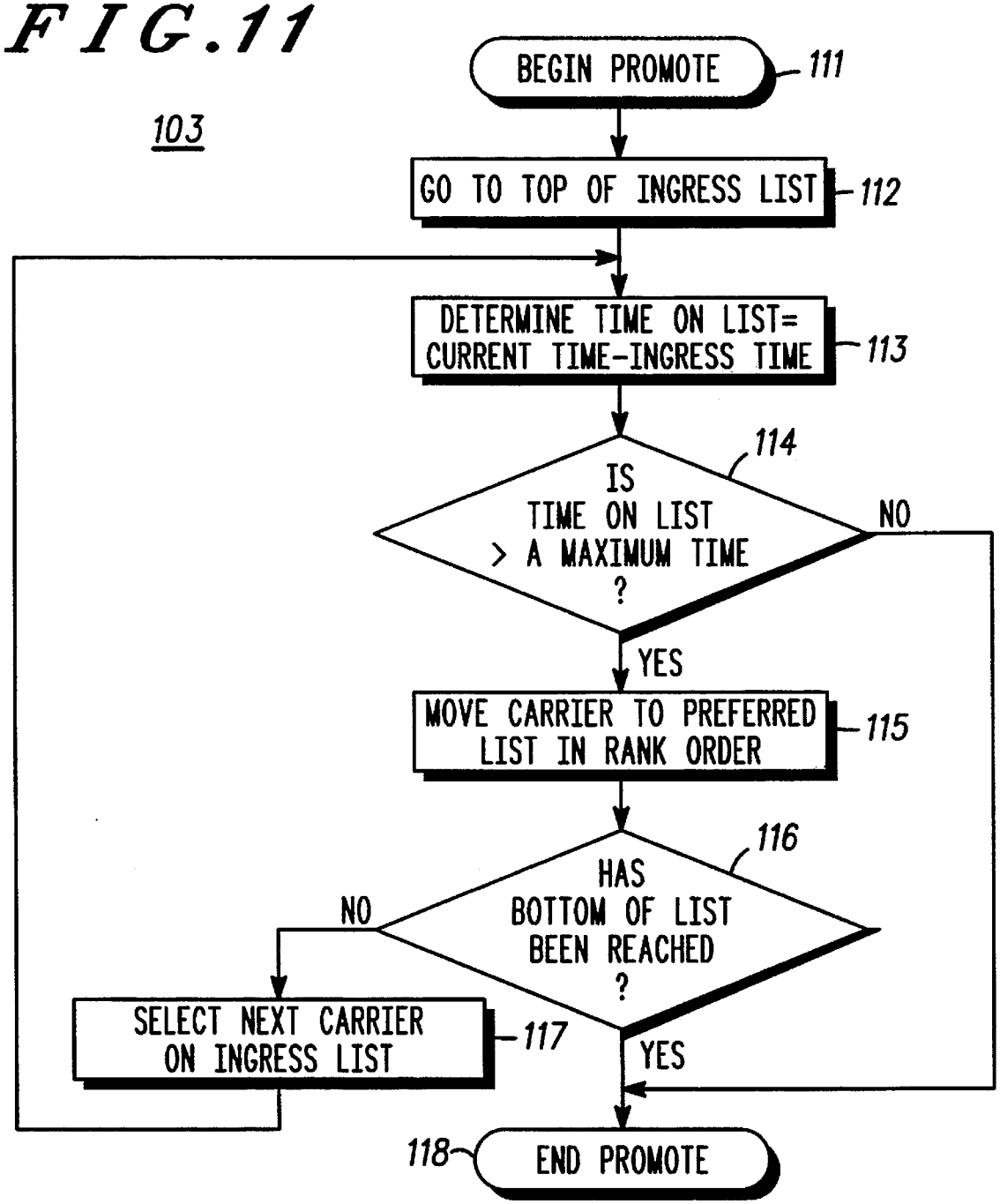

Subprocess 103 is illustrated in more detail in FIG. 11 beginning with step 111. Process 103 starts with the top of the ingress list, step 112, since the carrier most recently experiencing ingress is always placed at the bottom of the ingress list. Next, in step 113, subprocess 103 determines the amount of time the carrier has been on the ingress list by subtracting the ingress time (e.g. the time the carrier was placed on the ingress list) from the current time. Subprocess 103 then determines if the time on the list exceeds some predetermined maximum time, decision step 114. If the time on the list does not exceed the maximum time, then it is known that no other carriers on the ingress list have been on the list long enough to be promoted and subprocess 103 ends.

Figure 9:
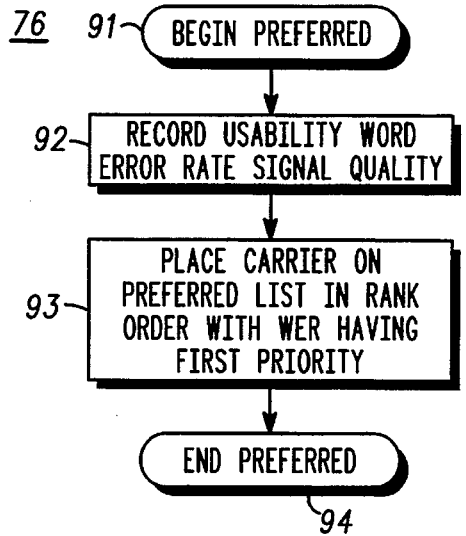

If the time determined in decision step 113 is greater than a maximum time, then the carrier is moved to a preferred list, step 115, and ranked in the manner using subprocess 74, FIG. 9. Subprocess 103 then determines if the bottom of the ingress list has been reached, decision step 116. If not, then the next carrier is selected, step 117, and subprocess 103 loops back to step 113. If the bottom of the list has been reached, then subprocess 103 ends, step 118, and returns to process 100.

Returning to FIG. 10, an ingress list timer is reset, step 104, and process 100 ends, step 105. At this point CPCU 26 continues with other control activities.

As stated previously, there would preferably be two lists maintained. One for downstream carriers and another for upstream carriers.

By providing this type of list, a system may utilize it to assign carriers for a broadcast channel, assign traffic channels, or use for link transfer purposes. The result will be a dynamically adaptable system utilizing the better carriers which will provide a better quality signal to the users.

Thus, it will be apparent to one skilled in the art that there has been provided in accordance with the invention, a method for selecting a channel in a communication system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method comprising the steps of:

measuring a usability of a number of carriers in a communication system to determine if a usability of any of the number of carriers is below a threshold;

for each one of the number of carriers which are below the threshold, placing the one of the number of carriers on a bottom of an ingress list after it has been evaluated to be below the threshold, wherein the bottom of the ingress list means latest in time for which ingress is detected; and for each one of the number of carriers on the ingress list, promoting the one of the number of carriers on the ingress list to a preferred list after a time on the ingress list for that one of the number of carriers is greater than a maximum predetermined time.

2. A method according to claim 1 wherein the step of measuring a usability comprises measuring each of the number of carriers at continuously at periodic intervals.

3. A method according to claim 1 wherein the method further comprises ordering all of the number of carriers having a usability above the threshold in a preferred list, wherein the order is according to a rank of a word error rate.

4. A method comprising the steps of:

measuring a usability of a number of carriers in a communication system continuously at periodic intervals to determine if a usability of any of the number of carriers is below a threshold;

for each one of the number of carriers which are below the threshold, placing the one of the number of carriers on a bottom of an ingress list after it has been evaluated to be below the threshold, wherein the bottom of the ingress list means latest in time for which ingress is detected; and for each one of the number of carriers on the ingress list, promoting the one of the number of carriers on the ingress list to a preferred list after a time on the ingress list for that one of the number of carriers is greater than a maximum predetermined time.

\* \* \* \* \*